(12) United States Patent
Oksman et al.

(10) Patent No.: US 9,230,087 B2
(45) Date of Patent: Jan. 5, 2016

(54) OPTICAL FILTER SECURITY

(71) Applicants: Henry Oksman, Scarsdale, NY (US); Benjamin Oksman, Scarsdale, NY (US)

(72) Inventors: Henry Oksman, Scarsdale, NY (US); Benjamin Oksman, Scarsdale, NY (US)

( * ) Notice: Subject to any disclaimer, the term of this patent is extended or adjusted under 35 U.S.C. 154(b) by 117 days.

(21) Appl. No.: 13/694,630

(22) Filed: Dec. 18, 2012

(65) Prior Publication Data
US 2013/0194166 A1 Aug. 1, 2013

Related U.S. Application Data

(60) Provisional application No. 61/630,767, filed on Dec. 19, 2011.

(51) Int. Cl.
*G06F 21/36* (2013.01)
*G06F 21/35* (2013.01)

(52) U.S. Cl.
CPC ............... *G06F 21/36* (2013.01); *G06F 21/35* (2013.01)

(58) Field of Classification Search
CPC ................................ G06F 21/36; G06F 21/35
USPC .......................................................... 380/54
See application file for complete search history.

(56) References Cited

U.S. PATENT DOCUMENTS

| | | | |
|---|---|---|---|
| 8,634,066 B1* | 1/2014 | Fraser | G06K 9/00577 356/71 |
| 2001/0026248 A1* | 10/2001 | Goren | G06F 21/62 345/7 |
| 2002/0108039 A1* | 8/2002 | Kubo et al. | 713/172 |
| 2005/0144450 A1* | 6/2005 | Voice | 713/169 |
| 2006/0031174 A1* | 2/2006 | Steinmetz | 705/67 |
| 2007/0094717 A1* | 4/2007 | Srinivasan et al. | 726/5 |
| 2008/0005035 A1* | 1/2008 | Schwartz et al. | 705/64 |
| 2008/0148352 A1* | 6/2008 | Matsumoto et al. | 726/2 |
| 2009/0277968 A1* | 11/2009 | Walker | G06Q 20/347 235/494 |
| 2010/0024004 A1* | 1/2010 | Boegelund et al. | 726/3 |
| 2010/0088754 A1* | 4/2010 | Ghislanzoni | 726/9 |
| 2010/0123943 A1* | 5/2010 | Umemoto et al. | 359/2 |
| 2010/0138912 A1* | 6/2010 | Bauchot et al. | 726/16 |
| 2011/0101088 A1* | 5/2011 | Marguerettaz et al. | 235/375 |
| 2011/0206285 A1* | 8/2011 | Hodge et al. | 382/224 |

OTHER PUBLICATIONS

Gao et al., A New Graphical Password Scheme Resistant to Shoulder-Surfing, Oct. 2010, International Conference on Cyberworlds, pp. 194-199.*

* cited by examiner

*Primary Examiner* — Kenneth Chang
(74) *Attorney, Agent, or Firm* — Jura C. Zibas; Gregory N. Brescia; Wilson, Elser, Moskowitz, Edelman & Dicker, LLP.

(57) ABSTRACT

An Optical Filter Security Invention incorporating an interactive system into a user authentication process (user name and password) and adding an additional simple layer of security that makes it much safer to perform online communications and transactions. It relates to the capability of the human eye to process information using a unique filter, such as a hand held card or a smart phone application, and the user's feedback of a security code into the computer for certification and protection of information.

29 Claims, 5 Drawing Sheets

Time sequence of images and filter outputs

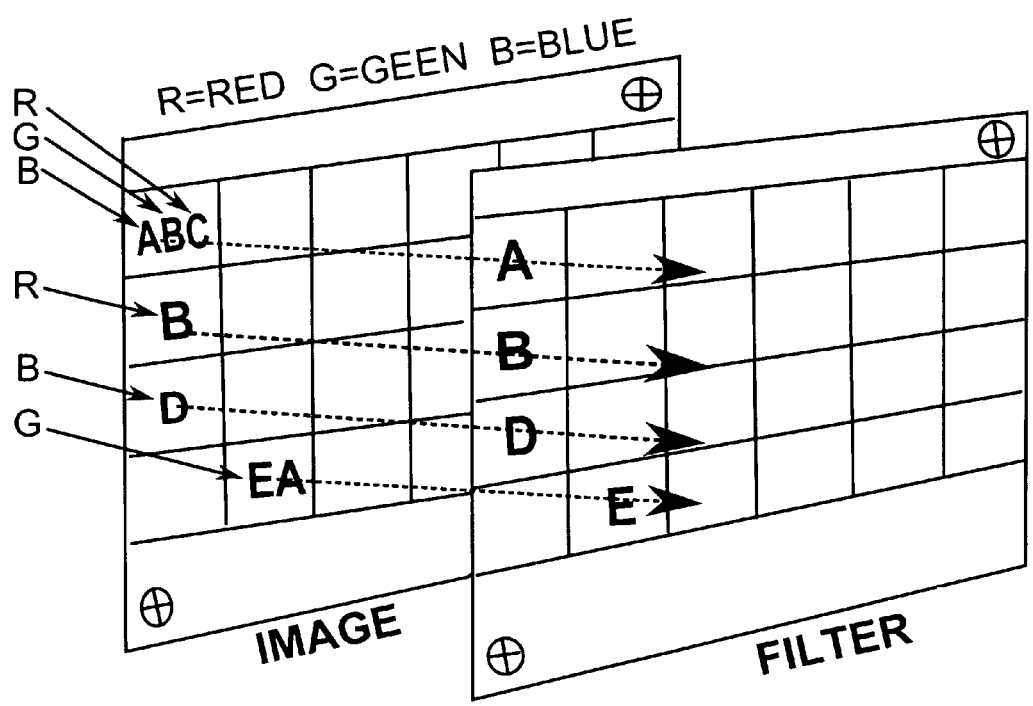
FIGURE 1: Color Filter Over Color Screen

SCREEN IMAGE

PLACE YOUR FILTER OVER THE IMAGE BELOW

| ⊕ C | P | K | H | C | R | D | R | E | R |
|---|---|---|---|---|---|---|---|---|---|
| B | Y | F | 9 | B | Y | F | 9 | F | 2 | 6 |
| X | X | 3 | 8 | G | X | H | 2 | H | 7 | E |
| 1 | 1 | 0 | 3 | 1 | 1 | 0 | 5 | 0 | 2 | V |
| 2 | S | S | D | 2 | S | R | 5 | R | Z | E |
| 3 | L | T | J | 3 | L | T | J | T | J ⊕ |

TYPE WHAT YOU SEE THROUGH THE FILTER IN THE PROMPT BELOW:

[ ] ( SUBMIT )

FIGURE 2: Screen Image with a matrix of letters displayed

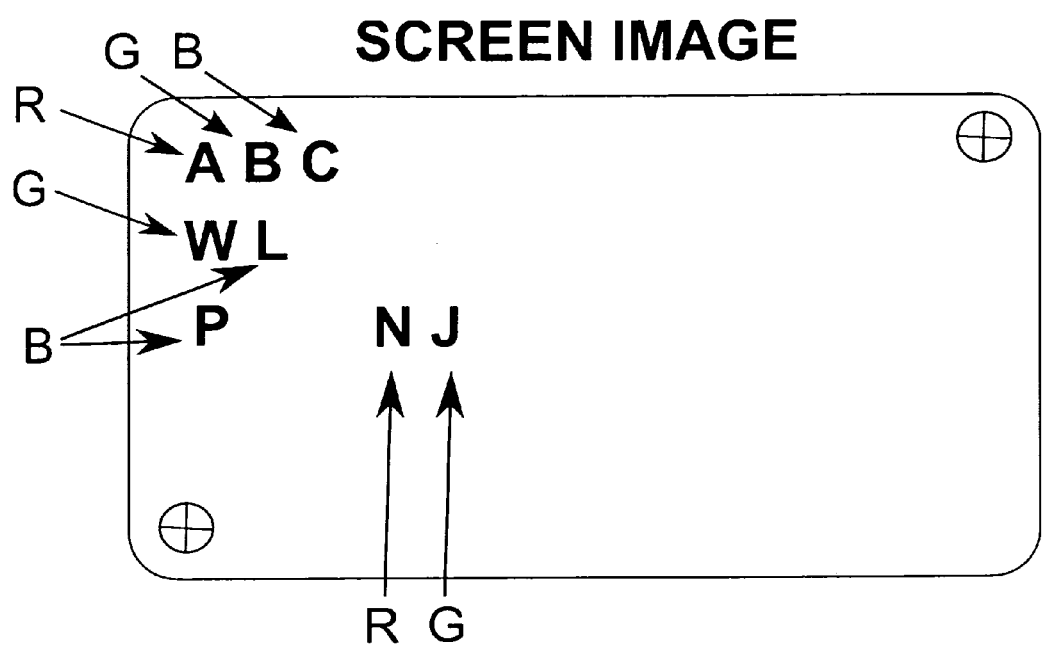
FIGURE 3: Screen image with letters of various colors

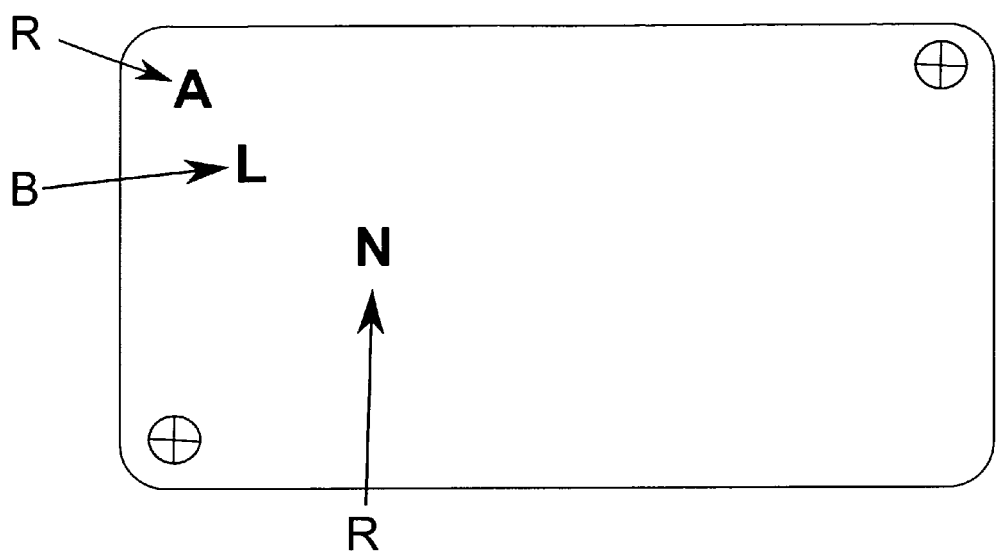
FIGURE 4: Filtered image with observed letters using screen image from Figure 3

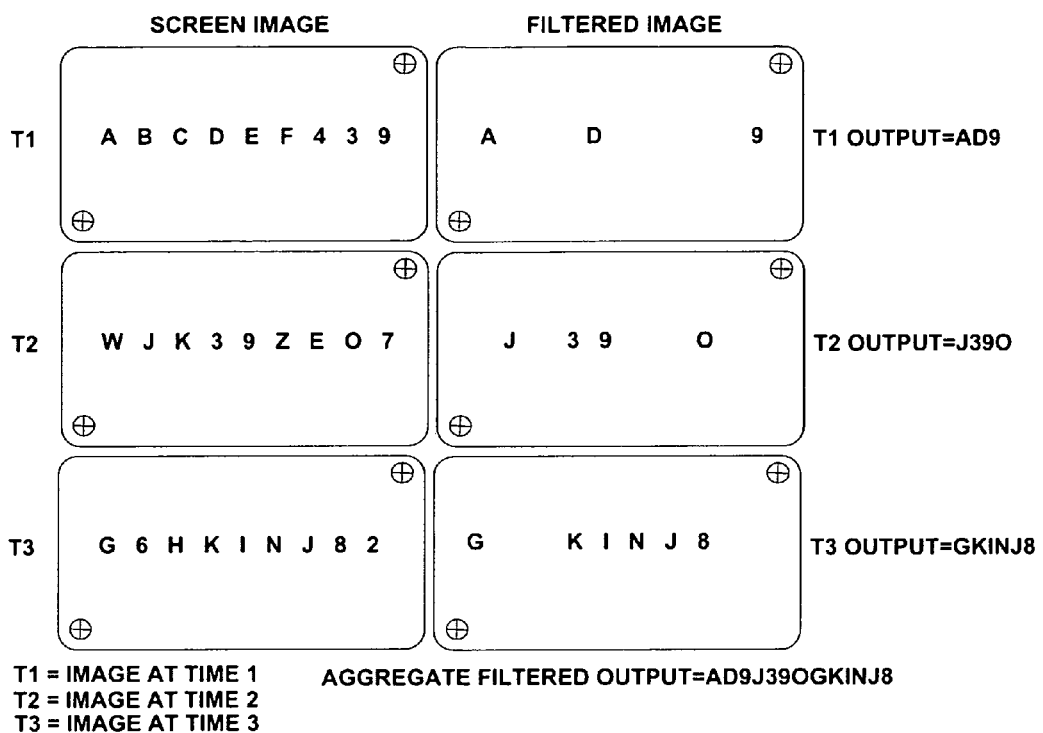
FIGURE 5: Time sequence of images and filter outputs

OPTICAL FILTER SECURITY

CROSS-REFERENCE TO RELATED APPLICATIONS

This Application claims priority from Provisional Application No. 61/630,767 filed on Dec. 19, 2011

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

The current invention generally relates to authentication systems and methods for providing additional security for authentication systems.

BACKGROUND OF INVENTION

Authentication is the process by which a system determines whether something is truly what it declares itself to be. In today's dynamic and diverse marketplace, authentication is vital to ensuring security and exclusivity when accessing or downloading information remotely. The most traditional authentication processes involve a username and password to log into a system. Secure keyboards, smartcards, electronic tokens, and key logger protection have provided a variety of complex and expensive means of improved security, but often fall short as hackers and identity thieves have easily tailored their software to adapt to any increased security devices. Generally, hackers plant viruses, Trojans, worms, key logging and screen recording programs to exploit the weaknesses in the authentication processes described above.

As we continue to move towards a remotely accessed marketplace, authenticating users and protecting their information has become necessary for maintaining and growing the remote marketplace. Furthermore, though authentication tokens, secure keyboards, and the like provide increased protection to the average consumer, their cost is prohibitive and they rely on a predetermined set of hardware and software devices.

The present invention overcomes these problems by allowing consumers to remotely access or download information from computers, televisions, cellular telephones, and the web in conjunction with a low cost easy to use authentication tool that uses human interaction and senses as well as simple technology to provide the average consumer with an inexpensive, convenient, highly secure, adoptable and easy to use system to remotely access information securely.

SUMMARY OF INVENTION

The present invention provides a unique Filter through which information is sieved then displayed and interpreted by the human eye. The user then processes the information and feeds back a security code into the computer. The Filter Image is presented on a visible medium and the Filter transforms the information whereby the user inputs a unique and random data to authenticate himself. The Filter image can be displayed on a computer screen, ATM screen or any similar active or passive display. The Filter Image can comprise of characters, images, or numbers in a matrix display, such as by a number of rows and columns lined up or scattered throughout the filter image. The data displayed can be in black and white, polarized or colored, such as red green, blue or other color. The data can be statically displayed with no change through the process or can alternate information in time so that a given location can display different letters or numbers at different times and with different colors.

In one embodiment of the invention, the Filter is the size and shape of a credit card. The Filter may take any other convenient shape or and size and its area is typically divided into segments. An example of the segmentation described above is a Filter with five rows and fifteen columns. A number of these segments can also have punch holes. For example, out of the seventy five potential segments eight may have open windows. These windows can be clear or open or can be a transparent color or polarized. By placing the Filter on the Filter Image the alignment of the two will display only eight images. These displayed images can be static in time or can be sequentially displayed and the image colors can change so that when a green letter is viewed through the red filtered window no image will appear. The images can be read from left to right in the static mode or as they appear in time in the timed mode. The open windows can also have numbers next to the window to designate which window is to be read first, second and so forth. The data observed by the user can also be used to prompt the user to change the information. For example, if the last number is 2, then the code is typed twice and the four visible letters become a code of eight letters. In another example, a user combines information allocated to his card to arrive at his unique authorization information.

In another embodiment of the present invention, the Filter is an active filter whereby the user looks at the image through a camera to authenticate himself/herself. In this embodiment, the user employs a camera phone where the Filter is a smart phone Application and the Filter Image is observed through the phone to authenticate the user. The active Filter can use colors that will act the same way as transparent colors on the regular Filter. The device or phone can then act as a Filter to interpret the Filter Image and authenticate the user.

In a third embodiment of the present invention, the Filter is a device such as liquid crystal windows with different colors. It can also be a device that will read digital data, such as blinking light or optical digital data from the screen transformed by the Filter and change its characteristics according to the new input information. In addition to authenticating a user, the method of the present invention can also be used to authenticate as any data, any software, video, audio or movie from various sources. It can also be coupled with electronic content to authenticate the source and to prevent malicious activity or illicit copying. The present invention can be used for securing online banking, for increased security without changing passwords regularly, securing VPN and other remote connections for employees, ATM transactions, and physical security for structures, securing credit cards and making their theft worthless for online authentication.

In essence, the current invention relates to a unique statistical arrangement for an image on a screen matrix such that the characters that are observed maximize the number of rounds that the product can handle in such a case as when a decoder tries to figure the card configuration by observing or recording the data transmitted. A unique optimization is figured whereby the screen matrix is made of letters in the same number (or very close to it) as the holes on the card and those letters are reused in the matrix. For a four hole card repeating letters on the matrix, such as xyzwxxzwwyxxx, will make it difficult to tell where the aperture that generated the specific letter exists. If there is a letter A that doesn't appear, than the intruder knows that the location of A on the matrix has no aperture, and so letters shown are used and repeated. Colors markedly increase the statistical difficulty for a spy system in its analysis of the data. Example, each hole has the statistical possibility of being clear, green, red or blue and so multiplies each hole by four possibilities and more letters can be used.

BRIEF DESCRIPTION OF THE DRAWINGS

FIG. 1 is a schematic diagram of the display screen on which the Filter Image is presented and the Filter through which the observer sees the final Filtered Image.

FIG. 2 is a schematic diagram of a screen image with a matrix of letters displayed. The display is marked to show where the Filter is to be overlaid. Below is a prompt to the user to input what he sees.

FIG. 3 is a schematic of a screen image with letters of various colors. Here the three primary colors of Red, Green and Blue are shown.

FIG. 4 is a schematic of the observed Filter Image and shows only those letters that are observed by a user after using the Filter. The rest of the letters are blocked and are not visible.

FIG. 5 is a schematic diagram of time sequence of images and filter outputs. In the first display, marked T1 the letters ABCDEF439 are shown and the view through the Filter shows only the letters AD9. During the second time display, T2, that follows time T1, the image shown is WJK39ZEO7 and the view through the filter shows only the letters J39O. During the third time display, T3, that follows time T2, the image shown is G6HKINJ82 and the view through the filter shows only the letters GKINJ8. The sequential result shows an aggregate output of AD9J39OGKINJ8.

DETAILED DESCRIPTION OF THE PREFERRED EMBODIMENTS

It is one object of the present invention to provide a secure mean of user authentication. In the preferred embodiment of the present invention, as shown in FIG. 1, once a user inputs the traditional login and password information into a computer generated user authentication screen, a Filter Image is presented onto the user's computer screen. The displayed Image will present an area on which the Filter will be placed. The manner in which the user reads the output will depend on the instructions for that specific Filter card. In the preferred embodiment of the present invention, a prompt will instruct the user how to interpret the Filter. One example of the prompt instructs the user to "type the letters as seen from left to right". In other embodiments of the present invention, the prompt is a numbered window on the Filter card and instructs the user to type according to the sequence requested by the card numbers.

If a typing error occurs, a new set of Filter Image data is generated and can be presented. This new set of generated Filter Image data is independent of the original information. The Filter Images that appear on a user's screen may be black and white or colored Images. In one embodiment of the present invention, the Filter Image is a polarized Image and the windows on the Filter card have polarized filters.

In another embodiment of the present invention, the Filter is made of a battery operated window device. In this embodiment, the transmission can be either opened or closed in any given window by a device such as a liquid crystal. Each Filter card has multiple windows through which the images are observed.

What is claimed is:

1. A system for providing visual display security comprising:
    a display medium;
    an optical filter; and
    an interactive interface,
    wherein at least two matrixes of images are sequentially displayed onto said display medium in different colors;
    wherein said optical filter is further comprised of colored filters for filtering said sequentially displayed matrixes of images of different colors to reveal select displayed images to a user;
    wherein the display medium is configured to prompt instructions for the user to supply a requested sequence of the revealed images after the user inputs login and password information;
    wherein said interactive interface is configured for receiving the user supplied sequence of the revealed images for user authentication; and
    wherein if a typing error occurs, the display medium generates and presents a new set of images.

2. The system for providing visual display security of claim 1, wherein the optical filter is a card with optical filter windows.

3. The system for providing visual display security of claim 1, wherein the optical filter is a smart phone viewed image.

4. The system for providing visual display security of claim 1, wherein the optical filter is driven by a smart phone application.

5. The system for providing visual display security of claim 1, wherein the optical filter is enabled with a prompt directing a user on a desired placement of the optical filter on the displayed images.

6. The system for providing visual display security of claim 1, wherein the display medium is a movie screen.

7. The system for providing visual display security of claim 1, wherein the display medium is a projector screen.

8. The system for providing visual display security of claim 1, wherein the displayed image is a matrix of characters, figures and pictures.

9. The system for providing visual display security of claim 1, wherein the displayed image is monochromatic.

10. The system for providing visual display security of claim 1, Wherein the displayed image is polychromatic.

11. They system for providing visual display security of claim 1, wherein the displayed image is polarized.

12. The system for providing visual display security of claim 1, wherein the display medium is an active electronic display device, wherein said display device further comprises a liquid crystal display (LCD) of light-emitting diode (LED) properties.

13. The system for providing visual display security of claim 1, wherein the display medium is a smart phone.

14. The system for providing visual display security of claim 1, wherein the optical filter is a polarized display window.

15. The system for providing visual display security of claim 1, wherein the optical filter is made of holes with monochromatic windows.

16. The system for providing visual display security of claim 1, wherein the optical filter is made of holes and polychromatic windows.

17. The system for providing visual display security of claim 1, wherein the optical filter is made of a liquid crystal display (LCD) or light-emitting diode (LED) transparent medium.

18. The system for providing visual display security of claim 1, wherein the images displayed by the display medium and the optical filter are static in time.

19. The system for providing visual display security of claim 1, wherein the images displayed by the display medium are sequential in time.

20. The system for providing visual display security of claim 1, wherein the system is integrated into an existing online user authentication mechanism such that before a user logs onto a website the user authenticates and verifies a user identity and/or an identity of the website.

21. The system for providing visual display security of claim 1, wherein the optical filter has individual windows that are numbered to give a user a specific sequence that the user may input in a given order for authentication purposes.

22. The system for providing visual display security of claim 1, wherein the selectively filtered image instructs a user on how to input data in a format for authentication.

23. The optical filter according to claim 1, wherein the optical filter is further comprised of polarized filters.

24. A system for system for user authentication consisting of:
    an interactive electronic device and an optical filter,
    wherein the electronic device generates a matrix of images that are sequentially displayed in different colors onto a screen of the electronic device, the optical filter is placed over the displayed images on the screen of the electronic device for selective display of filtered images, and an interactive interface authenticates a user based on an accuracy of the filtered images
    wherein said optical filter is further comprised of colored filters for filtering said matrix of sequentially displayed images of different colors to reveal select displayed images to the user;
    wherein said screen of the electronic device is configured to prompt instructions for the user to supply a requested sequence of the revealed images after the user inputs login and password information;
    wherein said interactive interface is configured for receiving the user supplied sequence of the revealed images for user authentication; and
    wherein if a typing error occurs, the electronic device generates and presents a new matrix of images.

25. The system for user authentication of claim 24, wherein the electronic device is a computer.

26. The system for user authentication of claim 24, wherein the electronic device is a smart phone.

27. The system for user authentication of claim 24, wherein the optical filter is an electronic device with a liquid crystal display (LCD) or a light-emitting diode (LED) screen.

28. The system for user authentication of claim 24, wherein the optical filter is a smart phone.

29. The image matrix on the screen of claim 24 further comprises a unique optimized set of images whereby a number of unique images equals a number of optically unique windows.

* * * * *